United States Patent [19]

Weston et al.

[11] Patent Number: 4,847,352

[45] Date of Patent: Jul. 11, 1989

[54] POLYCARBONATE PRODUCTION WITH MOTIONLESS MIXER

[75] Inventors: John W. Weston; Ronald R. Smith, II, both of Lake Jackson; Jose L. Aguilar, Richwood, all of Tex.

[73] Assignee: The Dow Chemical Company, Midland, Mich.

[21] Appl. No.: 89,658

[22] Filed: Aug. 26, 1987

[51] Int. Cl.$^4$ ............................................. C08G 63/62
[52] U.S. Cl. .................................... 528/196; 525/462; 528/198; 528/199
[58] Field of Search ...................... 528/196, 198, 199; 525/462

[56] References Cited

U.S. PATENT DOCUMENTS

| | | | |
|---|---|---|---|
| 3,133,044 | 5/1964 | Allen et al. | 260/47 |
| 3,240,755 | 3/1966 | Cawthon et al. | 260/47 |
| 3,530,094 | 9/1970 | Schnell et al. | 260/47 |
| 3,674,740 | 7/1972 | Vernalcken et al. | 260/47 |
| 3,787,359 | 1/1974 | Horn et al. | 260/47 |
| 3,945,969 | 3/1976 | Horn et al. | 260/47 |
| 3,974,126 | 8/1976 | Narita et al. | 260/47 |
| 4,122,112 | 10/1978 | Koda et al. | 260/463 |

OTHER PUBLICATIONS

S. J. Chen et al. Chemical Engineering, Mar. 19, 1973 pp. 105–111.

*Primary Examiner*—Harold D. Anderson
*Attorney, Agent, or Firm*—Benjamin G. Colley

[57] ABSTRACT

Polycarbonate prepolymers are produced by adding phosgene, one or more dihydric phenols, a halogenated organic solvent, and an aqueous caustic solution together with mixing in motionless mixers to form fine dispersions of partially phosgenated phenols, allowing for interfacial reactions to occur in residence time sections and repeating the steps after the addition of caustic to form high molecular weight prepolymers. These prepolymers are then polymerized with amines to form high molecular weight polycarbonates.

8 Claims, No Drawings

POLYCARBONATE PRODUCTION WITH MOTIONLESS MIXER

BACKGROUND OF THE INVENTION

This invention relates to an interfacial process for the production of high molecular weight polycarbonates wherein high molecular prepolymers are first formed using motionless mixers and then coupled to form the polycarbonates.

It is known from U.S. Pat. No. 3,674,740 that polycarbonates can be made from the usual monomers using a series of mixing tubes and residence time tubes. However, this known process is designed to produce emulsions which are then difficult to process for the recovery of the polycarbonate resins. Other related processes for the production of polycarbonates are known from U.S. Pat. Nos. 974,126 and 3,530,094 but none of these parents teach the making of high molecular weight prepolymers and the polymerization thereof.

SUMMARY OF THE INVENTION

The present invention is directed to a process wherein high molecular weight polycarbonates are prepared by first forming a polycarbonate prepolymer having a molecular weight range of about 4000 to about and mixing an amine catalyst with the prepolymer to form a high molecular weight polycarbonate resin. The process for making the prepolymer comprises the following steps (A) mixing one or more dihydric phenols, an aqueous caustic solution, a halogenated organic solvent and phosgene by means of at least one motionless mixer to form a fine dispersion of the partially phosgenated derivatives of said phenols in said aqueous solution, (B) allowing said dispersion to react in a residence time section with a residence time in the range from about 10 to about 75 seconds into a coarse dispersion containing said partially phosgenated derivatives of said phenols, (C) repeating the mixing and reacting steps of A and B one or more times until said phenols are completely phosgenated, (D) mixing additional aqueous caustic solution with said dispersion, (E) cooling said dispersion to a temperature in the range from about 25° to about 45° C., and (F) repeating the mixing and reacting steps of A and B whereby a dispersion of a polycarbonate prepolymer having a molecular weight range of about 4000 to about 12000 is obtained.

DETAILED DESCRIPTION OF THE INVENTION

Examples of useful halogenated solvents useful in this invention are chlorobenzene, chloroform, carbon tetrachloride, 1,2-dichloroethane, methylene chloride, 1,1,2-trichloroethane, tetrachloroethane, and mixtures thereof.

Normally, about 1.2 to 2.0 moles of phosgene will be used per mole of dihydric phenol in this process. A slight excess of phosgene is used in order to achieve complete reaction.

The pH of the final reaction mixture after the amine addition is maintained in the range from about 11 to about 13 depending on the bisphenol used and preferably in the range from 11 to 11.5.

Any suitable aromatic dihydroxy compound can be used in the present invention. There are vast numbers of suitable dihydroxy compounds cited in the patent literature as is illustrated by U.S. Pat. No. 3,530,094. This patent is incorporated by reference herein.

For the purposes of this invention, the interfacial process used herein produces a dispersion of the prepolymers suspended in the aqueous phase and the droplets in the dispersion have a range from about 100 to about 1000 microns. This excludes the known emulsions which have a drop size of about one micron.

The motionless mixers used herein are well known in the art as shown by the article by Chen et al in Chemical Engineer 1973 Mar. 19, 1973 pgs 105–111.

The invention is further illustrated by the following non-limiting examples.

EXAMPLE 1

Using a flow rate of 100 ml per minute, a mixture of p-tertiarybutyl phenol, water, methylene chloride, phosgene, sodium hydroxide and bisphenol A, was pumped through a series of two in-line motionless mixers having a diameter of 0.187 inches and connected by a pipe having a diameter of 0.375 inches with a total residence time of one minute for the series. The weight ratio of the ingredients compared to bisphenol A were 0.023: 5.20: 7.14: 0.61: and 0.74 respectively. After the monomers were mixed, 10.5 gms per minute of a 50% aqueous solution of sodium hydroxide was added to the reactants and further mixing was done in a third motionless mixer followed by a continuously stirred reactor having a residence time of 3 minutes.

A sample of the prepolymer mixture was analyzed and found to have a weight average molecular weight of 4380, a polydispersity of 2.75,384 parts per million of phenolic end groups, and a chloroformate to hydroxyl mole ratio of 30. By using published correlations, the droplet size was calculated to be about 1000 μm.

After the addition of 1.5 gms of triethylamine to the prepolymers and three minutes of mixing, a sample of the mixture was processed and the bis phenol A polycarbonate was isolated. It was found to have weight average molecular weight of 28,390, a polydispersity of 2.36, and 80 parts per million of phenolic end groups.

Control A

The procedure of Example 1 was repeated except that the 50% NaOH was not added. The results are shown in Table I.

Control B

The procedure of Example 1 was repeated except that the motionless mixer in the NaOH section was not used but a continuously stirred tank reactor was used instead. The results are shown in Table I.

TABLE I

| | Prepolymer Properties | | | |
|---|---|---|---|---|
| Run | Mol. Wt. | Poly-dispersity | Phenolic End Groups (ppm) | Chloroformate/ OH Mole Ratio |
| Example I | 4380 | 2.75 | 384 | 30 |
| Control A | 800 | 2.0 | 800 | 40 |
| Control B | 2300 | 2.2 | 2372 | n.a. |

EXAMPLE 2

This Example is a process similar to Example 1, except that the continuous addition of triethylamine was used. A monomer mixture consisted of 213 pounds per hour (pph) of bisphenol A, 157 pph of 50% sodium hydroxide solution, 1112 pph of water, and 3.3 pph of p-tertiarybutyl phenol was continuously mixed together in a mixing tank. In a similar tank, 122 pph of phosgene, and 778 pph of methylene chloride were mixed together to form a solvent mixture. These two mixtures were combined and pumped through a series of two motionless mixers having a diameter of 1.0 inch connected together by piping to give 30 seconds of residence time in the pipes between the mixers.

After the last mixer and residence time lag, 92 pph of 50% sodium hydroxide solution was added to the reactants. The heat of the reaction was removed with a tube and shell heat exchanger so as to keep the reaction mixture at a temperature in the range from 25° to 50° C. A sample of the reaction mixture at this point indicated that the prepolymer had a molecular weight of 6,167, a polydispersity of 1.98, and 209 parts per million of phenolic end groups.

The cooled mixture was pumped through another series of four motionless mixers similar to the first series connected together by piping to give 30 seconds of residence time in the pipes between the mixers. The total residence time in this set of mixers was 2 minutes. An estimation of the droplet sizes of the dispersion based on published correlations indicated that it had droplet sizes ranging from 300 to 500 pm which is much less than the dispersion of Example 1.

After the last mixer, 3.1 pph of triethylamine and 1556 pph of methylene chloride was added to the dispersion and it was pumped through another series of five similar motionless mixers connected together by piping to give 30 seconds of residence time in the pipes between the mixers. The dispersion after these mixers contained no detectable chloroformate end groups.

After recovering the polycarbonate resin, it was found to have a weight average molecular weight of 39,800, a polydispersity of 2.8, and 51 parts per million of phenolic end groups.

EXAMPLES 3 AND 4

The procedure of Example 2 was repeated with the same and different amounts of the p-tertiarybutyl phenol chain terminator. The results are set forth in Table II.

TABLE II

| Run | Amount of Terminator (pph) | Prepolymer MW | Polymer MW |
| --- | --- | --- | --- |
| Ex 3 | 6.43 | 5,900 | 21,300 |
| Ex 4 | 3.30 | 11,200 | 44,000 |

EXAMPLE 5

The procedure of Example 1 was substantially repeated except that the heat exchanger was removed and the three minute stirred reactor was replaced with a stirred flash tank equipped with a reflux condenser for cooling. The flash tank had a residence time of 15 minutes. A sample of the prepolymer before the flash tank was found to have a molecular weight of 7500. Triethylamine at the rate of 0.02 gms per minute was added to the tank. The resulting polycarbonate resin had a molecular weight of 30,200 with a polydispersity of 2.5.

We claim:

1. A process for the production of high weight average molecular weight polycarbonate resins which consists essentially of the steps of
   (A) mixing one or more dihydric phenols, an aqueous caustic solution, a halogenated organic solvent and phosgene by means of at least one motionless mixer to form a fine dispersion of the partially phosgenated derivatives of said phenols in said aqueous solution,
   (B) allowing said dispersion to react in a residence time section with a residence time in the range from about 5 to about 75 seconds into a coarse dispersion containing said partially phosgenated derivatives of said phenols,
   (C) repeating the mixing and reacting steps of A and B one or more times until said phenols are completely phosgenated,
   (D) mixing additional aqueous caustic solution with said dispersion,
   (E) repeating the mixing and reacting steps of A and B whereby a dispersion of a polycarbonate prepolymer having a weight average molecular weight range of about 4000 to about 12000 is obtained,
   (F) simultaneously cooling said dispersion to a temperature in the range from about 25° to about 45° C. and mixing a tertiary amine catalyst with said dispersion to form said polycarbonate resin, and
   (G) recovering said polycarbonate resin.

2. A process for the production of high weight average molecular weight polycarbonate resins which consists essentially of the steps of
   (A) mixing bisphenol A, an aqueous caustic solution, methylene chloride and phosgene by means of at least one motionless mixer to form a fine dispersion of the partially phosgenated derivatives of said bisphenol A in said aqueous solution,
   (B) allowing said dispersion to react in a residence time section with a residence time in the range from about 20 to about 40 seconds into a coarse dispersion containing said partially phosgenated derivatives of said bisphenol A,
   (C) repeating the mixing and reacting steps of A and B one or more times until said bisphenol A is completely phosgenated,
   (D) mixing additional aqueous caustic solution with said dispersion,
   (E) repeating the mixing and reacting steps of A and B whereby a dispersion of a bisphenol A polycarbonate prepolymer having a weight average molecular weight range of about 4000 to about 12000 is obtained, and
   (F) simultaneously cooling said dispersion to a temperature in the range from about 25° to about 45° C. and mixing a tertiarylamine catalyst with said dispersion to form said polycarbonate resin, and
   (G) recovering said polycarbonate resin.

3. A process for the production of high weight average molecular weight polycarbonate resins which consists essentially of the steps of
   (A) mixing one or more dihydric phenols, an aqueous caustic solution, a halogenated organic solvent and phosgene by means of a motionless mixer to form a fine dispersion of the partially phosgenated derivatives of said phenols in said aqueous solution, (B) reacting said dispersion in a residence time section with a residence time in the range from about 5 to about 75 seconds into a coarse dispersion containing said partially phosgenated derivatives of said phenols, (C) mixing said coarse dispersion containing said partially phosgenated derivatives of said phenols in a second motionless mixer to form a second fine dispersion, (D) reacting said dispersion in a second residence time section into a coarse dispersion containing said phosgenated derivatives of said phenols, (E) mixing additional aqueous caustic solution with said dispersion, (F) cooling said dispersion to a temperature in the range from about 25° to about 45° C., (G) repeating the mixing and reacting steps of A–D until a dispersion of a polycarbonate prepolymer having a weight average molecular weight range of about 4000 to about 12000 is obtained, (H) cooling said dispersion to a temperature in the range from about 25° to about 45° C. and mixing a tertiary amine catalyst with said dispersion to form said polycarbonate resin, and (I) recovering said polycarbonate resin.

4. A process for the production of high weight average molecular weight polycarbonate resin which consists essentially of the steps of (A) mixing bisphenol A, an aqueous caustic solution, a chlorinated organic solvent and phosgene by means of a motionless mixer to form a fine dispersion of the partially phosgenated derivatives of said bisphenol in said aqueous solution, (B) reacting said dispersion in a residence time section with a residence time in the range from about 20 to about 40 seconds into a coarse dispersion containing said partially phosgenated derivatives of said bisphenol, (C) mixing said coarse dispersion containing said partially phosgenated derivatives of said phenol in a second motionless mixer to form a second fine dispersion, (D) reacting said dispersion in a second residence time section into a coarse dispersion containing said phosgenated derivatives of said bisphenol, (E) mixing additional aqueous caustic solution with said dispersion, (F) cooling said dispersion to a temperature in the range from about 25° to about 45° C., and (G) repeating the mixing and reaction steps of A–D until a dispersion of a polycarbonate prepolymer having a weight average molecular weight range of about 4000 to about 12000 is obtained, (H) cooling said dispersion to a temperature in the range from about 25° to about 45° C. and mixing a tertiary amine catalyst with said dispersion to form said polycarbonate resin, and (I) recovering said polycarbonate resin.

5. An interfacial process for the production of high weight average molecular weight polycarbonate resins which consists essentially of the steps of (A) mixing one or more dihydric phenols, an aqueous caustic solution, a halogenated organic solvent and phosgene by means of at least one motionless mixer to form a fine dispersion of the partially phosgenated derivatives of said phenols in said aqueous solution, (B) reacting said dispersion in a residence time section with a residence time in the range from about 5 to about 75 seconds into a coarse dispersion containing said partially phosgenated derivatives of said phenols, (C) repeating the mixing and reacting steps of A and B one or more times until said phenols are completely phosgenated, (D) mixing additional aqueous caustic solution with said dispersion, (E) cooling said dispersion to a temperature in the range from about 25° to about 45° C., (F) repeating the mixing and reacting steps of A and B whereby a dispersion of a polycarbonate prepolymer having a weight average molecular weight range of about 4000 to about 12000 is obtained, (G) mixing a tertiary amine catalyst with said dispersion to form said polycarbonate resin, and (H) recovering said polycarbonate resin.

6. An interfacial process for the production of high weight average molecular weight polycarbonate resins which consists essentially of the steps of (A) mixing bisphenol A, an aqueous caustic solution, methylene chloride and phosgene by means of at least one motionless mixer to form a fine dispersion of the partially phosgenated derivatives of bisphenol A in said aqueous solution, (B) allowing said dispersion to react in a residence time section with a residence time in the range from about 20 to about 40 seconds into a coarse dispersion containing said partially phosgenated derivatives of bisphenol A, (C) repeating the mixing and reacting steps of A and B one or more times until said bisphenol A is completely phosgenated, (D) mixing additional aqueous caustic solution with said dispersion, (E) cooling said dispersion to a temperature in the range from about 25° to about 45° C., (F) repeating the mixing and reacting steps of A and B whereby a dispersion of bisphenol A prepolymer having a weight average molecular weight range of about 4000 to about 12000 is obtained, (G) mixing a trialkylamine with said dispersion to form said polycarbonate resin, and (H) recovering said polycarbonate resin.

7. An interfacial process for the production of high weight average molecular weight polycarbonate resins which consists essentially of the steps of (A) mixing one or more dihydric phenols, an aqueous caustic solution, a halogenated organic solvent and phosgene by means of a motionless mixer to form a fine dispersion of the partially phosgenated derivatives of said phenols in said aqueous solution, (B) reacting said dispersion in a residence time section with a residence time in the range from about 5 to about 75 seconds into a coarse dispersion containing said partially phosgenated derivatives of said phenols, (C) mixing said coarse dispersion containing said partially phosgenated derivatives of said phenols in a second motionless mixer to form a second fine dispersion, (D) reacting said dispersion in a second residence time section into a coarse dispersion containing said phosgenated derivatives of said phenols, (E) mixing additional aqueous caustic solution with said dispersion, (F) cooling said dispersion to a temperature in the range from about 25° to about 45° C., (G) repeating the mixing and reacting steps of A–D until a dispersion of a polycarbonate prepolymer having a weight average molecular weight range of about 4000 to about 12000 is obtained, (H) mixing a tertiary amine catalyst with said dispersion to form said polycarbonate resin, and (I) recovering said polycarbonate resin.

8. A interfacial process for the production of high weight average molecular weight polycarbonate resins which consists essentially of the steps of (A) mixing bisphenol A, an aqueous caustic solution, a chlorinated organic solvent and phosgene by means of a motionless mixer to form a fine dispersion of the partially phosgenated derivatives of said bisphenol in said aqueous solution, (B) reacting said dispersion in a residence time section with a residence time in the range from about 5 to about 75 seconds into a coarse dispersion containing said partially phosgenated derivatives of said bisphenol, (C) mixing said coarse dispersion containing said partially phosgenated derivatives of said phenol in a second motionless mixer to form a second fine dispersion, (D) reacting said dispersion in a second residence time section into a coarse dispersion containing said phosgenated derivatives of said bisphenol, (E) mixing additional aqueous caustic solution with said dispersion, (F) cooling said dispersion to a temperature in the range from about 25° to about 45° C., (G) repeating the mixing and reacting steps of A–D until a dispersion of a polycarbonate prepolymer having a weight average molecular weight range of about 4000 to about 12000 is obtained, (H) mixing a trialkylamine with said dispersion to form said polycarbonate resin, and (I) recovering said polycarbonate resin.

* * * * *